United States Patent
Ambs et al.

(10) Patent No.: US 10,180,168 B2
(45) Date of Patent: Jan. 15, 2019

(54) ACTUATOR ARRANGEMENT

(71) Applicant: IMS Gear SE & Co. KGaA, Donaueschingen (DE)

(72) Inventors: Marcel Ambs, Furtwangen (DE); Jens Fechler, Huefingen (DE); Bjoern Karnat, March (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 25 days.

(21) Appl. No.: 14/628,725

(22) Filed: Feb. 23, 2015

(65) Prior Publication Data
US 2015/0308528 A1 Oct. 29, 2015

(30) Foreign Application Priority Data
Mar. 21, 2014 (EP) .................................... 14161067

(51) Int. Cl.
*F16D 65/18* (2006.01)
*B60T 7/10* (2006.01)
(Continued)

(52) U.S. Cl.
CPC .............. *F16D 65/18* (2013.01); *B60T 7/107* (2013.01); *B60T 13/741* (2013.01); *F16D 55/08* (2013.01);
(Continued)

(58) Field of Classification Search
CPC .. F16D 65/18; F16D 55/08; F16D 2055/0008; F16D 2125/48; H02K 7/116; H02K 5/04; B60T 7/107
(Continued)

(56) References Cited

U.S. PATENT DOCUMENTS

| 4,804,073 A | * | 2/1989 | Taig ...................... B60T 13/741 |
| | | | 188/72.1 |
| 5,237,231 A | * | 8/1993 | Blaettner ................. H02K 1/17 |
| | | | 310/239 |

(Continued)

FOREIGN PATENT DOCUMENTS

| DE | 195 21 394 | 12/1996 |
| DE | 10 2008 030 535 A1 | 12/2009 |

(Continued)

OTHER PUBLICATIONS

Search report from corresponding European patent application No. 14161067.5 dated Mar. 18, 2015.
(Continued)

*Primary Examiner* — Xuan Lan Nguyen
(74) *Attorney, Agent, or Firm* — William Gray Mitchell

(57) ABSTRACT

An actuator arrangement for a brake, particularly an electric parking brake or an electro-mechanic operating brake with a brake pad-adjustment unit that can be driven by an actuator arrangement. The actuator arrangement comprises: an electric motor, a transmission unit located in a housing, which is coupled to the electric motor and is effectively connected at the output side with the brake pad, adjustment unit, a mechanism for fastening the actuator arrangement at the caliper or at the brake pad, adjustment unit, a plug accept for a connection plug of an electric connection unit, which is electrically connected to the electric motor, the electric motor is encompassed at least partially by an encasement, at which the plug accept is formed in one piece, and/or the fastening mechanism are embodied as a separate exchange part, with fastening openings, and fixed at the actuator arrangement in a torque-proof fashion.

5 Claims, 6 Drawing Sheets

(51) Int. Cl.
*B60T 13/74* (2006.01)
*F16D 55/08* (2006.01)
*H02K 5/04* (2006.01)
*H02K 7/116* (2006.01)
*F16D 55/226* (2006.01)
*F16D 121/24* (2012.01)
*F16D 125/48* (2012.01)
*F16D 55/00* (2006.01)

(52) U.S. Cl.
CPC ............ *F16D 55/226* (2013.01); *H02K 5/04* (2013.01); *H02K 7/116* (2013.01); *F16D 2055/0008* (2013.01); *F16D 2121/24* (2013.01); *F16D 2125/48* (2013.01)

(58) Field of Classification Search
USPC ........................................................ 188/162
See application file for complete search history.

(56) References Cited

U.S. PATENT DOCUMENTS

| | | | | |
|---|---|---|---|---|
| 5,245,237 A * | 9/1993 | Fisher | .................... | H02K 5/225 310/89 |
| 5,407,400 A * | 4/1995 | Thomas | ............. | A01D 34/6812 477/21 |
| 2008/0290760 A1* | 11/2008 | Matsushita | ........... | F16D 55/226 310/67 R |
| 2010/0132505 A1* | 6/2010 | Hsieh | .................... | E05D 13/003 74/625 |
| 2012/0272763 A1* | 11/2012 | Murakami | ............ | F16H 57/025 74/412 R |
| 2012/0325601 A1* | 12/2012 | Giering | ................ | F16D 65/0006 188/162 |
| 2013/0049510 A1* | 2/2013 | Choi | ......................... | H02K 1/17 310/154.01 |
| 2013/0106219 A1* | 5/2013 | Schneider | ................ | H02K 5/16 310/89 |
| 2013/0180811 A1* | 7/2013 | Poertzgen | ............. | B60T 13/741 188/156 |
| 2014/0034430 A1 | 2/2014 | Fuse et al. | | |

FOREIGN PATENT DOCUMENTS

| | | |
|---|---|---|
| KR | 20-1926224 | 9/1998 |
| KR | 10-2010-0132808 | 12/2010 |
| WO | WO 03/008248 A1 | 1/2003 |
| WO | WO 2011/0176299 | 12/2009 |
| WO | WO 2011/076299 | 6/2011 |
| WO | WO 2011/076299 A1 | 6/2011 |

OTHER PUBLICATIONS

Search report from corresponding European patent application dated Feb. 12, 2014.

Office Action from corresponding Korean patent application 10-2015-0038788, dated Nov. 4, 2016.

Office Action from corresponding Korean patent application 10-2017-0140840, dated Nov. 16, 2017.

* cited by examiner

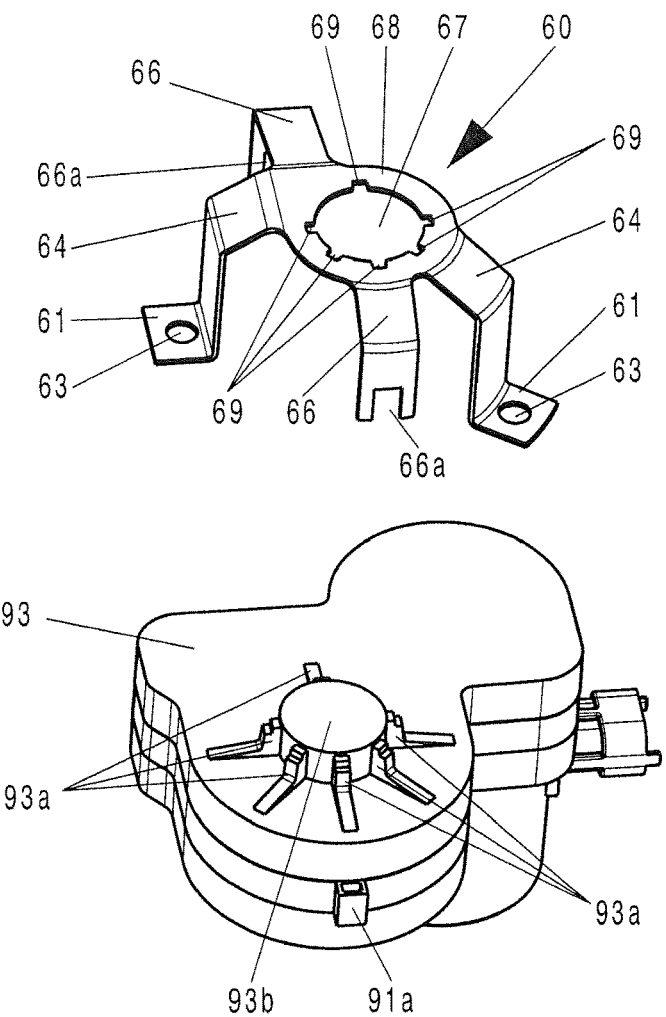
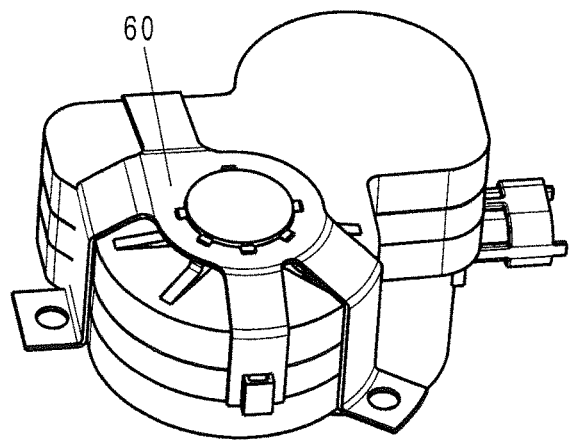
Fig.7
Fig.8

ACTUATOR ARRANGEMENT

CROSS REFERENCE TO RELATED APPLICATIONS

This patent application claims priority to European Patent Application 14 161 067.5, filed on Mar. 21, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a multicomponent gear.

Background of the Invention

The invention relates to an actuator arrangement for a brake, particularly an electric parking brake and/or an electromechanical operating brake, as particularly used in motor vehicles.

Such an actuator arrangement is known, for example, from DE 10 2008 030 535 A1. The actuator arrangement is designed in a modular fashion and comprises a saddle-type brake unit. In the housing of this brake unit, in a manner known per se, two opposite brake pads are arranged, and at least one of them can be made to approach the other one via a brake piston. The actuator arrangement serves for this displacement of the brake piston. It comprises an electric motor and a transmission unit embodied as a reduction gear unit driven by the electric motor. At the output side the transmission unit is coupled to a brake pad-adjustment unit, in order to axially move a piston located inside the brake pad-adjustment unit. The shifting of this piston then ultimately leads to the displacement of the brake pad. The actuator arrangement is here screwed fixed to the housing of the brake unit via suitable connection screws. The transmission unit comprises a belt, which on one side is wrapped around the output pinion of the electric motor in a force-transmitting fashion and further engages a driving sprocket of a planetary gear. At the output side the planetary gear is provided for the purpose to set into rotation the rotary spindle, which is in a torque-proof connection to the brake pad-adjustment unit, which at the face moves the above-mentioned piston.

In this brake unit of prior art the housing of the brake unit, the electromotive drive unit with the electric motor, the transmission unit, and the control unit have already been embodied as separate modules. Depending on the given need, here one of the modules can be exchanged for an appropriate, differently designed module, if the mechanic interfaces of the individual modules remain constant. However, there is room for improvement in this brake unit of prior art with regards to a simple design, a cost-effective production, and its possibility of adjustment to different requirements.

This represents the foundation of the present invention.

The objective of the invention is to further develop the actuator arrangement of prior art for an electric parking brake in motor vehicles such that it can be constructed in an even simpler fashion and produced more cost-effectively. In particular, it shall be possible to meet requests of specific users regarding the different interfaces of the actuator arrangement, independent from each other and specific for each application, in a particularly simple fashion.

BRIEF SUMMARY OF THE INVENTION

In a preferred embodiment, an actuator arrangement for a brake, particularly an electric parking brake or an electromechanic operating brake with a brake pad-adjustment unit, which can be driven by an actuator arrangement, with the actuator arrangement being designed in a modular fashion and showing the following features:
an electric motor,
a transmission unit located in a housing, which is coupled to the electric motor and at the output side is effectively connected to the brake pad-adjustment unit,
fastening means for fastening the actuator arrangement at the caliper or the brake pad-adjustment unit, and
a plug accept or a connection plug of an electric connection unit, which is electrically connected to the electric motor, and wherein:
the electric motor is at least partially encompassed by an encasement, at which the plug accept is formed in one piece for the connection plug, and
the fastening means are embodied as a separate exchange part, provided with at least one fastening opening and fixed in a torque-proof fashion at the actuator arrangement.

In another preferred embodiment, the actuator arrangement as described herein, wherein the encasement is made from plastic and embodied as a cylindrical plastic cup, in which the electric motor is accepted with its motor housing, with the plug accept extending in one piece from a cylindrical wall of the plastic cup.

In another preferred embodiment, the actuator arrangement as described herein, wherein the entire electric contacting of the drive unit is arranged in the encasement.

In another preferred embodiment, the actuator arrangement as described herein, wherein the transmission unit with its transmission elements is located inside the transmission carrier cup forming a part of the housing, which at its bottom shows two recesses through which a motor shaft of the electric motor projects as well as an output shaft of the transmission unit, and with it being possible to close the transmission carrier cup by a housing lid at its side opposite the two recesses.

In another preferred embodiment, the actuator arrangement as described herein, wherein the transmission carrier cup is made from plastic and, fixed at a rotationally symmetric joined connection, an encasement is assembled with the encasement accepting the electric motor, particularly by a material-to-material connection, such as ultrasound welding, laser welding, or adhesion.

In another preferred embodiment, the actuator arrangement as described herein, wherein the fastening means are embodied as a metallic stamped part or a plastic part.

In another preferred embodiment, the actuator arrangement as described herein, wherein the fastening means are embodied as an insertion part, which can be inserted into a groove of the transmission carrier cup and can be fixed in a torque-proof fashion, there.

In another preferred embodiment, the actuator arrangement as described herein, wherein the insertion part is embodied like a clamp or at least approximately U-shaped.

In another preferred embodiment, the actuator arrangement as described herein, wherein the insertion part can be connected to the transmission carrier cup via pins or bolts.

In another preferred embodiment, the actuator arrangement as described herein, wherein the fastening means are embodied as an attachment part, which sits on the actuator arrangement in a torque-proof fashion.

In another preferred embodiment, the actuator arrangement as described herein, wherein the attachment part is fixed at latching cams of the transmission carrier cup and/or the housing lid of the actuator arrangement.

In another preferred embodiment, the actuator arrangement as described herein, wherein the transmission carrier cup and the housing lid each are made available in different sizes, with the interface to the encasement of the electric motor always being embodied rotationally symmetrical with identical diameters.

BRIEF DESCRIPTION OF THE DRAWINGS

FIG. 7 is a line drawing evidencing a second exemplary embodiment of an actuator arrangement in which the fastening means is embodied as an attachment part, in an exploded illustration.

FIG. 8 is a line drawing evidencing a similar view as in FIG. 7, however in an assembled state.

DETAILED DESCRIPTION OF THE INVENTION

Figure 1:
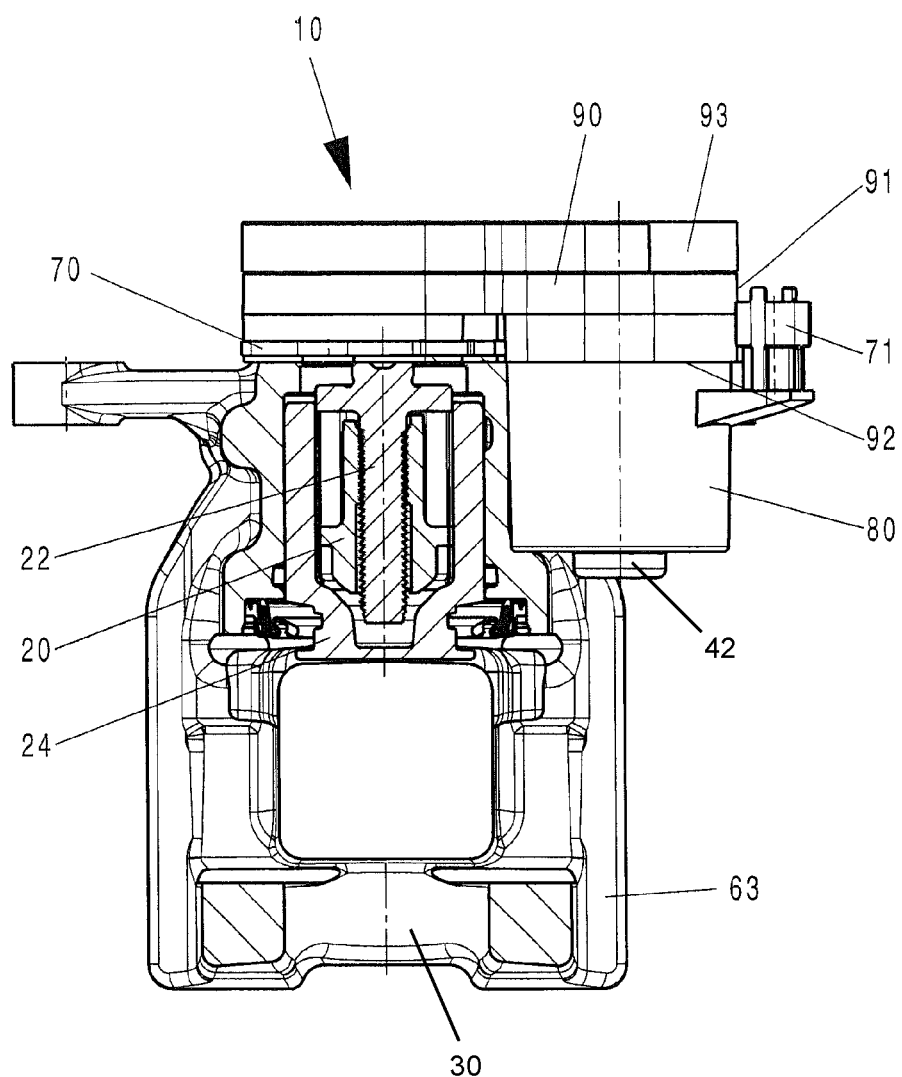
FIG. 1 is a line drawing evidencing a perspective view of an exemplary embodiment of an actuator arrangement with a transmission unit located in a housing.

The invention is based on two suggestions, which beneficially can be combined with each other, which however also can be applied individually in actuator arrangements of electric parking brakes.

On the one hand, it is provided according to the invention that the electric motor, which regularly is already placed in a cup-shaped housing, generally made from metal, is additionally encompassed by an encasement, at which the sockets of the electric connection unit for a connection plug is formed in one piece. In particular, when this encasement accepting the electric motor is formed as a rotary symmetrical cylindrical cup, the direction of accepting the connection plug can be arbitrarily aligned in the circumferential direction by rotating this cup. This way, many different requests of customers can already be met, which provide their electric plug connections respectively aligned in different radial directions.

The second solution, according to the invention, includes to embody the fastening means for fastening the actuator arrangement at the caliper or the brake pad-adjustment unit as a separate part, particularly an exchangeable part, and to provide it with fastening openings, with these fastening means being fixed at the actuator arrangement in a torque-proof fashion. In order to meet the different fastening conditions of the various customers, it is therefore only necessary to provide different separate parts, which are inserted into the fastening openings as specified by the customer. There is no need to change the remaining actuator arrangement, though.

In a further development of the invention, these fastening means are either designed as an insertion part like a tongue-and-groove connection or they are embodied as an attachment part. Advantageously these fastening means are produced as stamped parts, particularly as metallic stamped parts.

In a further development of the invention, the above-mentioned encasement is made from plastic. Here, the encasement is beneficially embodied as a cylindrical plastic cup, in which the electric motor is accepted with its separate motor housing. The plug accept is here formed according to the invention in one piece at the cylindrical plastic cup, namely preferably at the cylindrical exterior wall of said plastic cup.

Although it is generally possible to embody the transmission unit in any arbitrary fashion, showing most different transmission elements, it is beneficial and included in the scope of the present invention that the individual transmission elements show a two-stage worm gear, directly driven by the motor shaft, which at the output side shows a shaft, which drives, for example, a rotary spindle connected in a torque-proof fashion to a brake pad-adjustment unit.

In a further development of the invention, the transmission unit is accepted with its transmission elements as well as its fastening elements inside a transmission carrier cup, which forms a part of the housing. Two recesses are provided at the bottom of this transmission carrier, by which on the one side the motor shaft of the electric motor projects and on the other side an output shaft of the transmission unit. Here, a sprocket may be arranged on the motor shaft of the electric motor, which is also guided through the above-mentioned recess. Beneficially, this transmission carrier cup is closed by a housing lid at the side opposite the two recesses.

In another embodiment of the invention, it is provided that not only the encasement is made from plastic, accepting the electric motor, but additionally also the transmission carrier cup, with the transmission carrier cup showing at its bottom a rotationally symmetrical join connection, at which the encasement is assembled fixed at the transmission carrier cup. This joining can occur via material-to-material bonding techniques, such as ultrasound welding, laser welding, or adhesion, however alternatively other form-fitting or material-to-material connections are possible as well.

Furthermore the invention provides that the above-mentioned fastening means are embodied as metallic stamped parts and/or metallic press-bent parts. Such a fastening means may be produced from sheet metal, for example. Alternatively the fastening means may also be produced as a plastic part. Here, the fastening means may either engage the transmission carrier cup as an insertion part like a tongue-and-groove connection and here be fixed in a torque-proof fashion, or as an attachment part, with the fastening means then beneficially being embodied as a fastening basket.

When the fastening means is embodied as an insertion part, it is designed in a simple fashion like a clamp or at least designed approximately U-shaped and can engage an appropriately circumferential groove, entered in the circumferential wall of the transmission carrier cup. Here, the insertion part can be fixed in a torque-proof fashion by its shape, additional torque accepts, as well as via additional pins and/or bolts, if necessary.

In an additional embodiment of the invention, it may be provided that the fastening means are fixed at latching cams of the transmission carrier cup and/or the housing lid of the actuator arrangement.

In the above-mentioned modular design of the entire actuator arrangement including the transmission carrier cup, housing lid, fastening means, and encasement for the electric motor it has proven particularly beneficial to render available the transmission carrier cups and the appropriate housing lids in different sizes, which are required by the axial distance of the motor shaft from the output shaft of the transmission unit. In all these parts, including those of different sizes, however it is to be observed according to the invention that the interfaces for the above-mentioned fastening means are always embodied identically, thus the insertion part provided for the purpose of fastening or the attachment part on the one side and the encasement for the motor. This way a high degree of flexibility is achieved, without here completely differently designed housing parts need to be warehoused. Accordingly, in the modular design of the actuator arrangement suggested in the invention any customer-specific interfaces, such as plug connections, screw eyelets for fastening the actuator arrangement, axial distance between the motor shaft and the output shaft, at the actuator arrangement of an electric parking brake and/or an electromechanical operating brake can be adjusted entirely independently and specifically for each application. Advantageously, based on the invention it is no longer necessary to design completely new housings and render them available, especially in cases when only a single one of the above-described customer interfaces needs to be specifically adjusted. The actuator arrangement according to the invention shows the decisive advantage that every one of the above-mentioned interfaces, thus the plug connection, screw eyelets, and axial distance of the motor shaft from the output shaft, are positioned on a separate housing part. All housing parts may be connected to each other via standardized interfaces at the actuator arrangement.

DETAILED DESCRIPTION OF THE FIGURES

FIG. 1 shows in a perspective illustration an actuator arrangement 10, which is fixed via fastening means 60, to be explained, at a brake pad-adjustment unit 20. This brake pad-adjustment unit 20 comprises internally a rotary spindle 22, which can be set in motion by the actuator arrangement 10 in order to approach a piston 24, located in the brake pad-adjustment unit 20, to adjust brake pads of a caliper 30, which is also only indicated schematically in FIG. 1. The brake pad-adjustment unit 20 and the caliper 30 are known per se, so that these components of the electric brake require no detailed explanation.

The actuator arrangement 10 comprises an electromotive drive unit with an electric motor 40.

This electric motor 40 commonly comprises already a separate, e.g., metallic, cylindrical housing, with at one side a motor shaft projecting therefrom. This motor shaft is here generally connected to a motor pinion in a torque-proof fashion. The complete electric motor 40 with its own housing is located in an encasement 80, which encompasses the electric motor 40 in a cup-shaped fashion. This encasement 80 is preferably made from plastic and is designed such that the complete electric motor 40 can be placed therein. The motor shaft 42 with the motor pinion 43 projects from the end of the encasement 80, open towards the top. A plug accept 71 is formed in one piece at the cylindrical circumferential area of the exterior wall of the encasement 80. As particularly clearly discernible from FIG. 5, the plug contacts 72 are located inside this plug accept 71, which contacts are electrically is connected to the electric motor 40 so that an electric plug connection, which can be plugged into the plug accept 71, which is connected to a respective electronic control unit, can impinge the electric motor with electric signals, particularly however can also supply it with suitable power.

The encasement 80 is fixed at the bottom 92 of another housing part 90, with this additional housing part 90 being provided as an accept for a transmission unit, and therefore in the following it is called a transmission carrier cup 90. The bottom 92 of this transmission carrier cup 90 shows a first recess 94, with the above-mentioned motor shaft 42 including the motor pinion 93 projecting therefrom. When the transmission carrier cup 90 is also made from plastic, fixing the encasement 80 at the bottom 92 of the transmission carrier cup 90 occurs via a material-to-material connection, for example via ultrasound welding, laser welding, or adhesion. Other connections are also possible.

By way of rotation, the encasement 80 can here be aligned in an arbitrary direction, so that the plug accept 71 comes to show an arbitrary angle as predetermined by the customer. When the encasement 80 is appropriately aligned, subsequently the fixation of the encasement 80 occurs at the bottom 92 of the transmission carrier cup 90.

Figure 5:
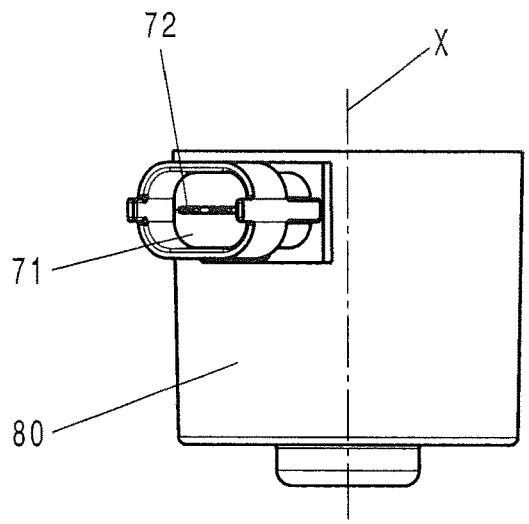
FIG. 5 is a line drawing evidencing a first variant of an encasement to accept an electric motor with a plug accept projecting perpendicularly in reference to the motor axis.
Figure 6:
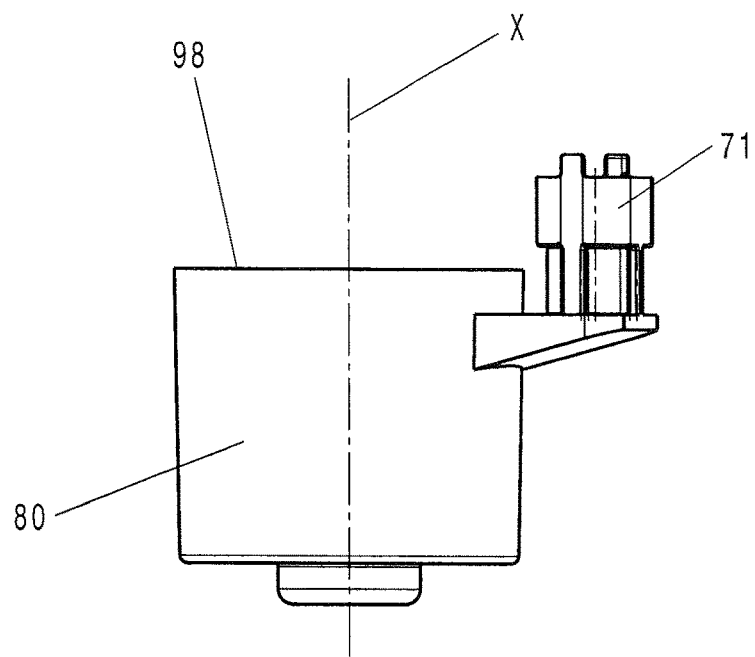
FIG. 6 is a line drawing evidencing a similar encasement as in FIG. 5, with the plug accept being aligned parallel in reference to the motor axis.

Potential embodiments of the encasement 80 for the electric motor 40 are shown in FIGS. 5 and 6. The plug accept 71 is located in FIG. 5 at the exterior cylindrical wall of the encasement 80 and projects perpendicularly in reference to the longitudinal axis X of the encasement 80. In the exemplary embodiment of FIG. 6 the plug accept 71 is however aligned parallel in reference to the longitudinal axis X. Other embodiments and placements of the plug accept are also possible.

Figure 4:
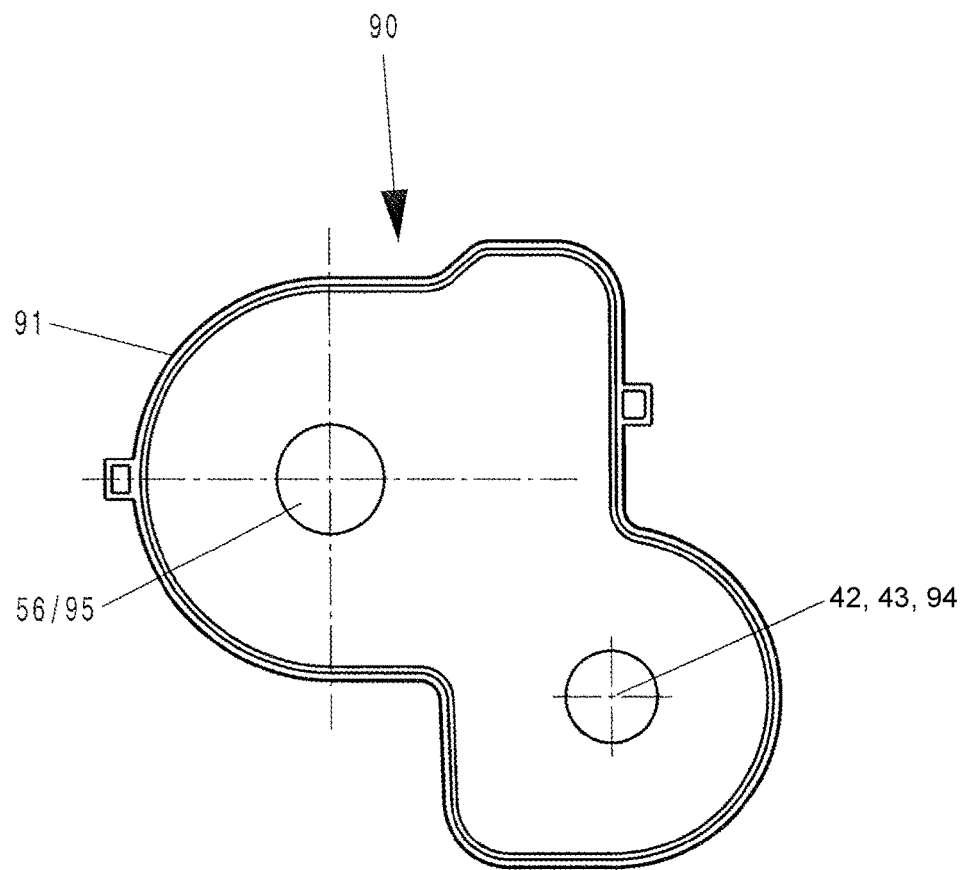
FIG. 4 is a line drawing evidencing a housing part of the actuator arrangement according to FIGS. 1 to 3 in the form of a transmission carrier cup, which accepts a plurality of transmission elements.

The transmission carrier cup 90 comprises at the bottom 92 a circumferential wall 91, extending in a direction away from the electric motor 40, so that overall a cup shape results for the transmission carrier cup 90. Additional transmission elements of the transmission unit are located between the wall 91. FIG. 4 shows a top view into the cup-shaped recess of the transmission carrier cup 90. Here, the above-mentioned first recess 94 is discernible, through which the motor shaft 42 including the motor pinion 43 is guided. This output shaft 56 of the transmission unit is then connected in a torque-proof fashion to the rotary spindle 22 of the brake pad-adjustment unit 20, as already explained, in order to cause the displacement of the piston 24 for the adjustment of the caliper.

As discernible from FIG. 1, the transmission carrier cup 90 is closed towards the top with a housing lid 93, which accepts parts of the transmission unit together with the transmission carrier cup.

Figure 2:
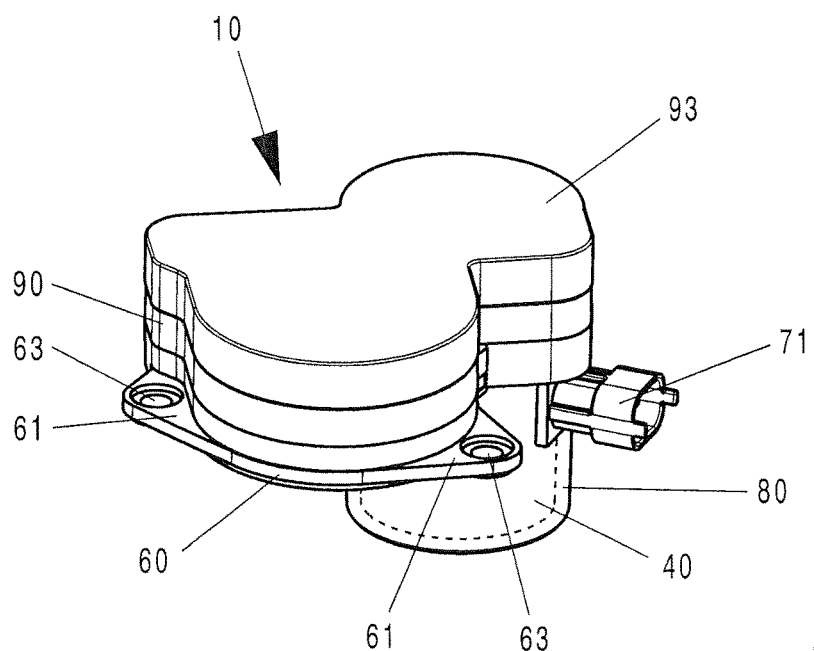
FIG. 2 is a line drawing evidencing the actuator arrangement shown in FIG. 1 in a perspective view with an inserted fastening means.

As shown in the above-explained illustrations in FIGS. 1 and 2, the axes of the motor shaft 42 and the output shaft 56 are aligned parallel in reference to each other, with the electric motor 40 including the housing 80 in the immediate proximity being aligned axially parallel in reference to the brake pad-adjustment unit 20.

Figure 3:
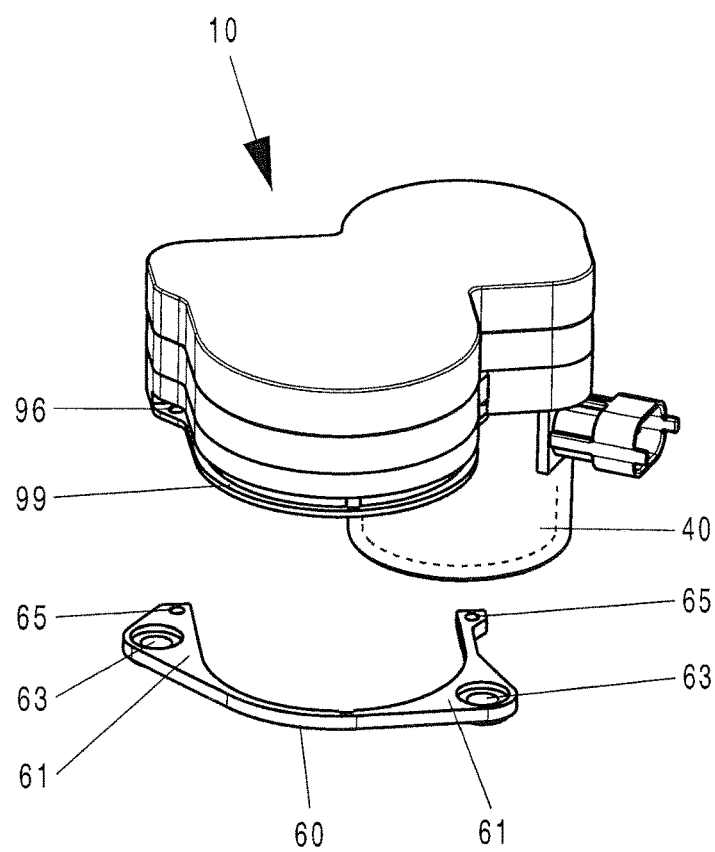
FIG. 3 is a line drawing evidencing a similar view as FIG. 2, however with the fastening means not yet assembled.

In the context with FIGS. 2 and 3, it is shown how a suitable fastening means 60 may be designed in order to fasten the actuator arrangement 10 at the brake pad-adjustment unit 20 and/or the caliper 30.

For this purpose, the fastening means 60 is embodied as a clamp-shaped or at least approximately U-shaped insertion part. This insertion part may engage, for example, a metallic stamped part, which engages in a U-shaped fashion an appropriate, circumferential groove 99 at the exterior circumference of the transmission carrier cup 90.

Here, this fastening means 60 comprises one or more fastening openings 63, through which respective fastening screws can be guided in order to fix via screws the actuator arrangement 10 at the caliper 30.

The fastening openings 63, with in FIGS. 2 and 3 respectively two units being provided, are located on fastening flanges 61, which project at the edge from the transmission carrier cup 90 when the clamp-like fastening means 60 is inserted into the groove 99 at the exterior circumference of the transmission carrier cup 90. In order to fix the fastening means 60 in or at the transmission carrier cup 90, as clearly discernible from FIG. 3, one bore 65 each may be provided at the ends of the two U-shaped legs of the fastening means 60, which correspond to the inserted fastening means 60 with respective bores 96 in the transmission carrier cup 90 such that bolts or pins can be guided through these openings 63, 96 in order to additionally fix the fastening means 60 in the transmission carrier cup 90, if necessary.

In order to meet the needs of various requirements for installation a high degree of variability with regards to the fastening options can be generated by providing different fastening means 60. Here it is only necessary to place the required fastening openings 63 and the corresponding fastening flanges 61 at a different position, as shown in FIGS. 2 and 3. Additionally it is also possible to provide more than two fastening openings 63 at the fastening means 60. In order to meet various conditions for fastening it is only necessary to insert an appropriately prepared different fastening means 60 into the groove 99 of the housing carrier cup 90 and to fix it there.

Another option to fasten the actuator arrangement 10 at a brake pad-adjustment unit 20 is shown based on FIGS. 7 and 8. Here, the transmission carrier cup 90 is not provided with a groove 99, extending around both parts of the transmission carrier cup 90, into which the fastening means 60 is inserted, but rather shows an attachment part and/or an attachment basket, which is placed from the top onto the actuator arrangement 90 and particularly placed on the housing lid 93 in a torque-proof fashion and encompasses the transmission carrier cup 90 with four arms 64, 66. This basket-like fastening part, again marked with the reference character 60, shows a central opening 67, which is surrounded by a circular fastening part 68. This annular fastening part 68 comprises several, in the present case seven grooves 69 at its central opening 67, which can engage respectively projecting cams 93a at the housing lid 93 such that the fastening part 60 can be arranged there in a torque-proof fashion.

An appropriately embodied mandrel 93b of the housing lid 93 projects through the opening 67 of the fastening part 60.

A total of four legs 66, 64, angled downwards, project from the annular fastening part 98, which are embodied and angled such that they can encompass the actuator arrangement 10, i.e. the housing lid 93 as well as the transmission carrier cup 90. The two legs 66 also show grooves 66a at their end, which engage appropriately projecting cams 90a of the transmission carrier cup 90. This way, an additional torque-proofing is ensured. The two other legs 64 located at the fastening part 60 are angled at their distal end by approximately 90° towards the outside and show here fastening flanges 61, in which again fastening openings 63 are inserted. With these fastening openings 63 the entire actuator arrangement 10 can then be fixed via screws to the brake pad-adjustment unit 20.

It is understood that, for example, by a simple change of the angular position of the fastening flanges 64 different fastening conditions of customers can be fulfilled for the actuator arrangement 10. Here, only the fastening bores 63 with the legs 64 need to be moved at the fastening part 60. Thus, by a simple exchange of this fastening means 60 here a wide variance of the fastening options is ensured in the otherwise unchanged actuator arrangement 10.

Figure 9:
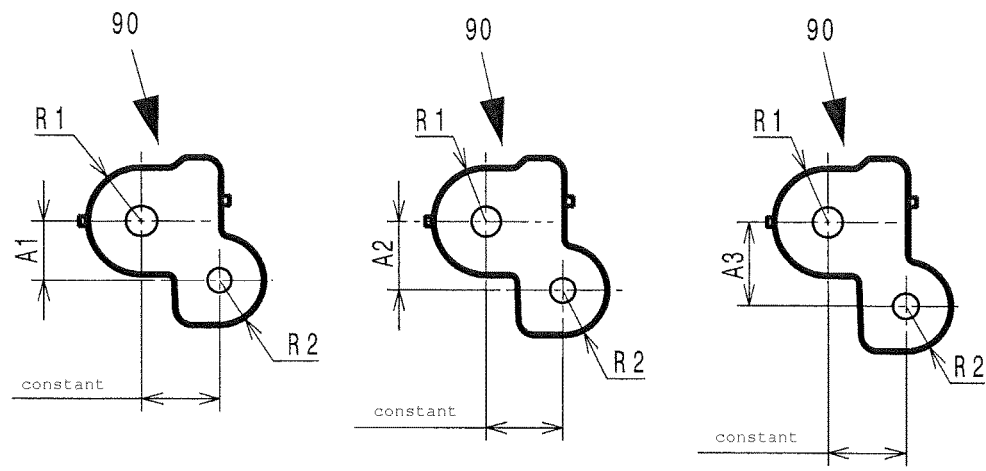
FIG. 9 is a line drawing evidencing various views of transmission carrier cups with different axial distances between the motor shaft and the output shaft of the transmission unit.
Figure 10:
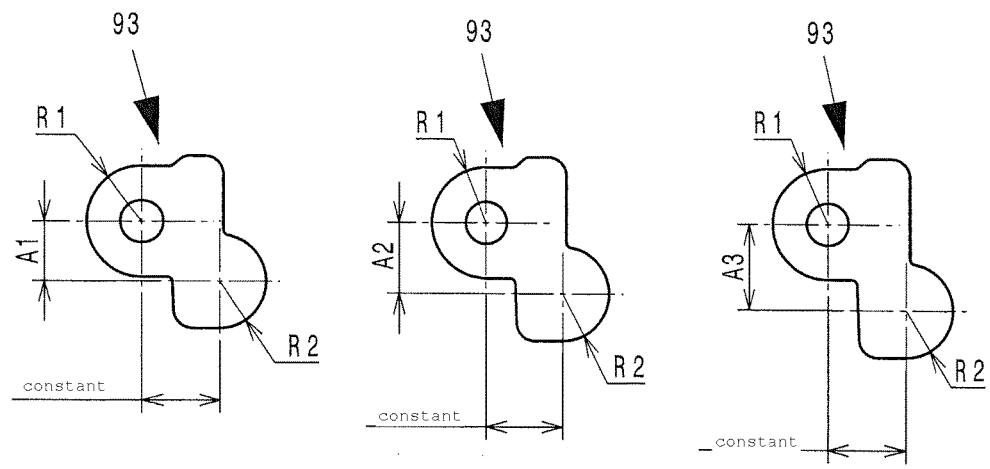
FIG. 10 is a line drawing evidencing housing lids matching the transmission carrier cups shown in FIG. 9.

In the context with FIGS. 9 and 10 the diversity of the suggested actuator arrangement is shown once more. FIG. 9 shows a top view into the inside of the transmission carrier cup 90. Here, three differently sized transmission carrier cups 90 are shown, which only differ from each other in that the axial distances A1, A2, A3 between the recesses 94, 95 are of different size. The individual interfaces to fasten the electric motor 40 and/or the encasement 80, in which the electric motor 40 is placed and the interface for the clamp-shaped fastening means 60, explained in the context with FIGS. 2 and 3, remain unchanged, though. This means that the radii R1, R2 drawn in FIG. 9 remain identical at the transmission carrier cups 90 in order to fasten the above-mentioned fastening means 90 and the encasement 80 thereat. The radius R1 is at least approximately equivalent to the radius of the U-shaped and/or clamp-shaped fastening means 60 of FIGS. 2 and 3, while the radius R2 defines the joint to the encasement 80, in which the electric motor 40 is located. FIG. 10 shows the housing lids 93 matching the differently sized transmission carrier cups 90 of FIG. 9, which also differ in their length.

It is noted that parts 50-54, comprising the transmission unit, do not appear in the figures as they are located within housing 90 and are thus visually obscured.

LIST OF REFERENCE NUMBERS

10 Actuator arrangement
20 Brake pad-adjustment unit
22 Rotary spindle
24 Piston
30 Caliper
40 Electric motor
41 Motor housing
43 Motor pinion
50 Transmission unit
51 Transmission element
52 Transmission element, spindle
53 Transmission element 54 Transmission element
56 Output shaft
60 Fastening means
61 Fastening flange
63 Fastening opening
64 Legs
65 Bore
66 Legs
66a Grooves
67 Opening
68 Annular fastening part
69 Grooves
71 Plug accept
72 Plug contacts
80 Housing
90 Housing, transmission carrier cup
90a Cams
91 Wall
91a Latching cam at the wall 91 of the housing 90
92 Bottom
93 Housing lid
93a Latching cam at the housing lid
93b Mandrel
94 Recess
95 Recess
96 Bore
99 Groove
100 Bolt
A1 Axial distance
A2 Axial distance
A3 Axial distance
R1 Radius
R2 Radius
X Longitudinal axis The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. An actuator arrangement for a brake, particularly an electric parking brake or an electro-mechanic operating brake with a brake pad-adjustment unit, which is driven by an actuator arrangement, with the actuator arrangement assembled in a modular fashion and showing the following features:
   an actuator,
   an electric motor,
   a transmission unit located in a housing, which is coupled to the electric motor and at the output side is effectively connected to the brake pad-adjustment unit,
   fastening means embodied as a separate exchange part for fastening the actuator arrangement at the caliper or the brake pad-adjustment unit, and
   a plug accept or a connection plug of an electric connection unit, which is electrically connected to the electric motor,
   and wherein:
   the electric motor is at least partially encompassed by an encasement, at which the plug accept is formed in one piece for the connection plug, and
   the fastening means is embodied as an attachment part and sits on the actuator, wherein such fastening means is fixed at the latching cams of a transmission carrier cup and the latching cams of a housing lid of the actuator arrangement.

2. The actuator arrangement of claim 1, wherein the encasement is made from plastic and embodied as a cylindrical plastic cup, in which the electric motor is accepted within a motor housing, with the plug accept extending in one piece from a cylindrical wall of the plastic cup.

3. The actuator arrangement of claim 1, further comprising wherein an entire electric contacting of a drive unit is arranged in the encasement.

4. The actuator arrangement of claim 1, wherein a transmission carrier cup is made from plastic and, fixed at a joined connection at the bottom of the transmission carrier cup, with the encasement accepting the electric motor, particularly by a material-to-material connection, such as ultrasound welding, laser welding, or adhesion.

5. The actuator arrangement of claim 1, wherein the fastening means are embodied as a metallic stamped part or a plastic part.

\* \* \* \* \*